US008170982B2

(12) United States Patent
Sunada

(10) Patent No.: US 8,170,982 B2
(45) Date of Patent: May 1, 2012

(54) COMPUTER READABLE MEDIUM AND INFORMATION PROCESSING APPARATUS

(75) Inventor: Akira Sunada, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 327 days.

(21) Appl. No.: 12/545,477

(22) Filed: Aug. 21, 2009

(65) Prior Publication Data

US 2010/0198883 A1 Aug. 5, 2010

(30) Foreign Application Priority Data

Jan. 30, 2009 (JP) .................................. 2009-019465

(51) Int. Cl.
 *G06F 17/00* (2006.01)
(52) U.S. Cl. ........ 707/602; 707/791; 707/793; 707/825; 707/674
(58) Field of Classification Search .................. 707/602, 707/674, 791, 793
See application file for complete search history.

(56) References Cited

U.S. PATENT DOCUMENTS

| 6,490,722 B1 * | 12/2002 | Barton et al. | 717/174 |
| 6,606,479 B2 * | 8/2003 | Cook et al. | 434/350 |
| 6,757,710 B2 * | 6/2004 | Reed | 709/203 |

FOREIGN PATENT DOCUMENTS

| JP | 02-266443 A | 10/1990 |
| JP | 11-120054 A | 4/1999 |
| JP | 2003-085015 A | 3/2003 |
| JP | 2004-021530 A | 1/2004 |
| JP | 2008-090383 A | 4/2008 |

OTHER PUBLICATIONS

Office Action dated Oct. 25, 2010 from the Japanese Patent Office in Japanese counterpart application No. 2009-019465.

* cited by examiner

*Primary Examiner* — Sana Al Hashemi
(74) *Attorney, Agent, or Firm* — Sughrue Mion, PLLC

(57) ABSTRACT

A computer readable medium storing a program that causes a computer to execute information processing is provided, wherein plural pieces of management object information are stored in a storage device with unique identification information and non-unique name information, the information processing including: receiving a process request that specifies management object information of a process object by using location information which is represented by a sequence of name information assigned to respective pieces of management object information; selecting one piece of management object information corresponding to the location information with reference to history information which is registered with the location information and the management object information being associated with each other; and sending back a result of a process that is executed for the selected management object information of the process object in accordance with the process request.

2 Claims, 7 Drawing Sheets

FIG. 2

211: OBJECT MANAGEMENT TABLE

| IDENTIFICATION ID | NAME INFORMATION | UPPER HIERARCHY | OWNERSHIP USER | CREATION DATE |
|---|---|---|---|---|
| ID-C1 | Root | — | User-1 | 2008/3/10 |
| ID-C2 | ProjectA | ID-C1 | User-1 | 2008/4/10 |
| ID-C3 | ProjectA | ID-C1 | User-2 | 2008/4/20 |
| ID-C4 | ProjectB | ID-C1 | User-2 | 2008/4/20 |
| ID-D1 | File1 | ID-C2 | User-1 | 2008/5/10 |
| ID-D2 | File1 | ID-C2<br>ID-C3 | User-2 | 2008/6/10 |
| ID-D3 | File2 | ID-C4 | User-1 | 2008/6/20 |
| ID-D4 | File3 | ID-C1 | User-3 | 2008/7/10 |
| ⋮ | ⋮ | ⋮ | ⋮ | ⋮ |

FIG. 4

212: HISTORY MANAGEMENT TABLE

| MANIPULATION USER | MANIPULATION OBJECT | LOCATION INFORMATION | MANIPULATION CONTENTS | MANIPULATION TIME |
|---|---|---|---|---|
| User-1 | ID-C1 | Root | View | 2008/8/10 12:12:22 |
| User-1 | ID-C2 | Root/ProjectA | View | 2008/8/10 12:12:30 |
| User-2 | ID-D1 | Root/ProjectA/File1 | Get | 2008/8/10 12:12:35 |
| User-1 | ID-C4 | Root/ProjectB | View | 2008/8/11 15:18:05 |
| User-3 | ID-C3 | Root/ProjectA | Set | 2008/8/11 15:18:10 |
| User-1 | ID-D3 | Root/ProjectB/File2 | Get | 2008/8/11 15:18:20 |
| User-2 | ID-C1 | Root | View | 2008/8/12 18:28:33 |
| User-2 | ID-C3 | Root/ProjectA | View | 2008/8/12 20:28:54 |
| User-1 | ID-D2 | Root/ProjectA/File1 | Get | 2008/8/12 20:29:10 |
| ... | ... | ... | ... | ... |

COMPUTER READABLE MEDIUM AND INFORMATION PROCESSING APPARATUS

CROSS-REFERENCE TO RELATED APPLICATIONS

This application is based on and claims priority under 35 U.S.C. 119 from Japanese Patent Application No. 2009-019465 filed Jan. 30, 2009.

BACKGROUND

1. Technical Field

The present invention relates to a computer readable medium and an information processing apparatus.

2. Related Art

A document management apparatus for assigning mutually different identifiers to each of the documents and performing management by a hierarchical directory structure is known conventionally.

SUMMARY

According to an aspect of the present invention, there is provided a computer readable medium storing a program that causes a computer to execute information processing, wherein plural pieces of management object information are stored in a storage device in a storage structure of a predetermined type with unique identification information and non-unique name information being assigned to each management object information, the information processing including:

receiving a process request that specifies management object information of a process object by using location information, wherein the location information is represented by a sequence of name information assigned to respective pieces of management object information from management object information serving as an origin to the management object information of the process object;

selecting, from the storage device as the management object information of the process object, one piece of management object information corresponding to the location information used by the received process request with reference to history information which is registered with the location information of the process object and the management object information of the process object being associated with each other; and sending back a result of a process that is executed for the selected management object information of the process object in accordance with the process request.

BRIEF DESCRIPTION OF THE DRAWINGS

Exemplary embodiment of the present invention will be described in detail based on the following figures, wherein:

FIG. 2 is a diagram showing one example of an object management table;

FIG. 4 is a diagram showing one example of a history management table;

DETAILED DESCRIPTION

An information processing apparatus according to an embodiment of the invention comprises a receiving step of receiving a process request in which management object information about a processing object is specified by location information represented by a sequence of name information respectively assigned to management object information from management object information used as an origin to management object information about a processing object among plural pieces of management object information stored in storage device by a storage structure of a predetermined kind, the management object information to which unique identification information and non-unique name information are assigned, a selection step of referring to history information in which the plural pieces of management object information and the location information are associated and registered and selecting one piece of management object information corresponding to the location information specified by the process request received by the receiving step from the storage device as management object information about the processing object, and a reply step of replying a result of performing processing according to the process request to management object information about the processing object selected by the selection step.

The management object information is an object objected for management and is, for example, a file and a directory. Also, the management object information may be stored by a link structure or by a hierarchical structure as a storage structure of a predetermined structure.

While the identification information does not permit overlap between plural pieces of management object information, the name information permits overlap between plural pieces of management object information and may be the same or different.

In the configuration described above, the management object information about a processing object corresponding to location information specified by a process request is selected by selection section, so that the management object information manipulated by a user in the past is selected as the processing object even when name information overlaps.

[Embodiment]

Figure 1:
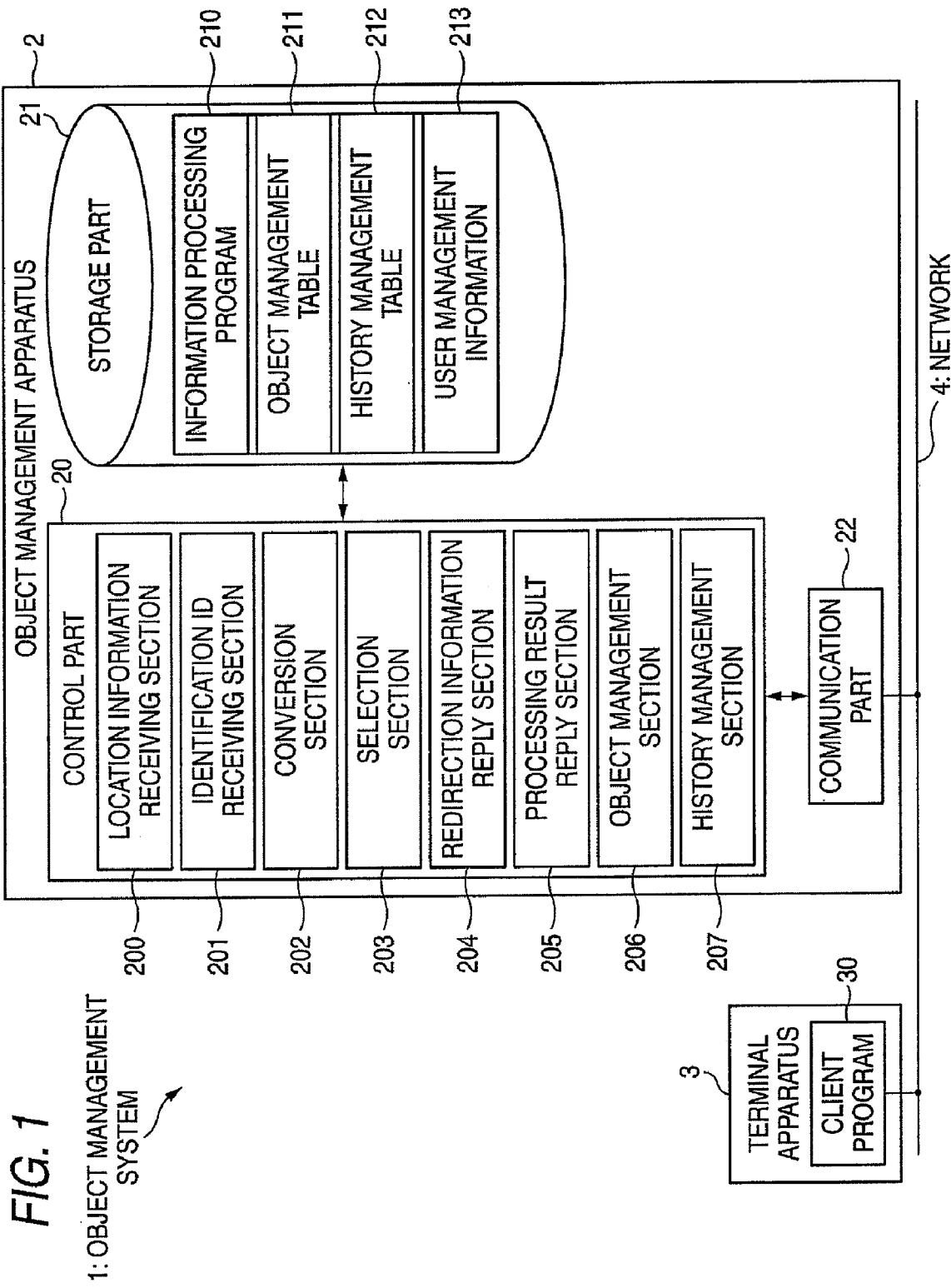
FIG. 1 is a block diagram showing one example of an outline configuration of an object management system according to an embodiment of the invention.

FIG. 1 is a block diagram showing one example of an outline configuration of an object management system according to an embodiment of the invention. In this object management system 1, a terminal apparatus 3 is connected to an object management apparatus 2 as an information processing apparatus for managing plural objects through a network 4. In addition, in FIG. 1, the number of terminal apparatuses 3 is one, but may be more than one.

The network 4 is a communication network such as the Internet or a LAN (local area network) for sending and receiving data by wire communication (electric cable, optical cable, etc.) and wireless communication (radio waves, infrared rays, etc.), etc.

(Terminal Apparatus)

The terminal apparatus 3 comprises a client program 30 for making a process request to an object stored in the object management apparatus 2. The client program 30 is, for example, a program operating according to WebDAV (Web-based Distributed Authoring and Versioning) defined as RFC (Request for Comment) 2518 by IETF (Internet Engineering Task Force). In addition, the client program 30 may adopt a communication protocol such as HTTP, RMI (Remote Method Invocation) or SOAP (Simple Object Access Protocol) in addition to the WebDAV.

The terminal apparatus 3 sends a process request to an object of a processing object specified among plural objects managed by the object management apparatus 2 to the object management apparatus 2 by operating according to its client program 30. Such a terminal apparatus 3 is constructed by a personal computer, a personal digital assistant (PDA), a mobile telephone, etc.

(Object Management Apparatus)

The object management apparatus 2 comprises a control part 20 which controls each part of this object management apparatus 2 and is implemented by, for example, a CPU, a storage part 21 which stores various programs and objects and is implemented by, for example, a hard disk, RAM or ROM, and a communication part 22 which is connected to the network 4 and is implemented by, for example, a network interface card. Such an object management apparatus 2 is constructed by, for example, a computer, a server or a workstation.

An information processing program 210, an object management table 211, a history management table 212 and user management information 213 are stored in the storage part 21.

The information processing program 210 executes each of the steps shown in flowcharts of FIGS. 5 to 7 described below.

For example, plural objects are hierarchically stored in the object management table 211. In addition, details of the object management table 211 will be described below.

Plural objects, location information about the object and a user ID, etc. manipulated with respect to the object are associated and registered in the history management table 212. The manipulation with respect to the object is performed according to, for example, a process request from the terminal apparatus 3 and, for example, a change in name information and a copy, transfer, editing, browsing of the object are given. In addition, details of the history management table 212 will be described below.

A password and a user ID, etc. allocated to each user are stored in the user management information 213.

The control part 20 functions as location information receiving section (first receiving section) 200, identification ID receiving section (second receiving section) 201, conversion section 202, selection section 203, redirection information reply section (first reply section) 204, processing result reply section (second reply section) 205, object management section 206 and history management section 207, etc. by operating according to the information processing program 210.

The location information receiving section 200 receives a process request including a user ID as user information and location information in which an object of a processing object is specified.

The identification ID receiving section 201 receives a process request including a user ID as user information and an identification ID in which an object of a processing object is specified.

The conversion section 202 refers to the object management table 211 and converts an identification ID specified by the process request received by the identification ID receiving section 201 into name information.

The selection section 203 refers to the history management table 212 and selects one object corresponding to a user ID and location information specified by the process request from the object management table 211 as an object of a processing object.

Concretely, the selection section 203 selects an object in which manipulation history information by a user shown by a user ID is registered in the history management table 212 as an object of a processing object. In addition, when plural objects are extracted as a result, the selection section 203 may select, for example, an object with a larger number of manipulations by comparing the number of manipulations or an object with the recent time and date of manipulation by comparing the time and date of manipulation as an object of a processing object.

In addition, it is unnecessary to include a user ID in the process requests received by the location information receiving section 200 and the identification ID receiving section 201 and in this case, the selection section 203 may select an object corresponding to location information specified by the process request or may select an object corresponding to a predetermined user ID in addition to the location information specified by the process request.

The redirection information reply section 204 replies redirection information including an identification ID assigned to an object of a processing object selected by the selection section 203. Also, the redirection information reply section 204 replies redirection information including location information converted by the conversion section 202.

The processing result reply section 205 replies a processing result in which processing according to a process request is performed by the object management section 206 to an object of a processing object selected by the selection section 203.

The object management section 206 manages the object management table 211. The object management section 206 performs processing of, for example, browsing, editing, transfer, a copy, or a change in name information.

The history management section 207 manages the history management table 212, and registers the contents of manipulation as manipulation history information every time manipulation with respect to an object is performed.

FIG. 2 is a diagram showing one example of the object management table. In this object management table 211, object information is stored every record. The object information is an identification ID for pinpointing an object, name information assigned to its object, an upper hierarchy indicating an object located in an upper hierarchy of its object by an identification ID, an ownership user indicating a user having the ownership right of its object by a user ID, a creation date of its object, etc. as shown in FIG. 2.

Figure 3:
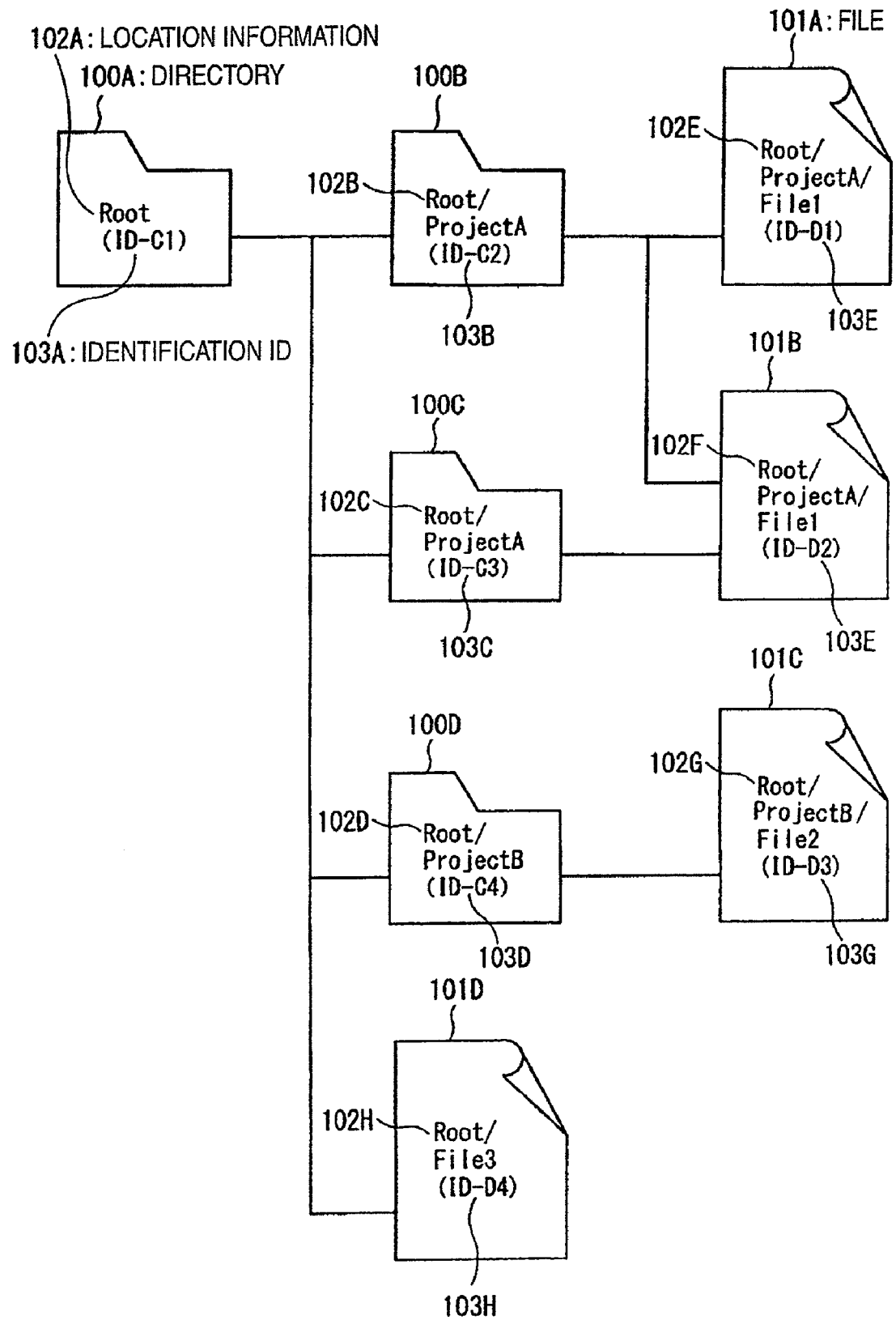
FIG. 3 is a diagram showing one example of plural objects stored hierarchically.

FIG. 3 is a diagram showing one example of a state of hierarchically storing plural objects under management of the object management table illustrated in FIG. 2. The same or different location information 102A to 102H and mutually different identification IDs 103A to 103H are assigned to each of the directories 100A to 100D and the files 101A to 101D. In addition, the directories correspond to collection in WebDAV.

For example, the file 101A is arranged under the directory 100B as an upper hierarchy and its directory 100B is further arranged under the directory 100A. The location information 102E about this file 101A is "Root/ProjectA/File1" in which name information respectively assigned to the directory 100A used as an origin, the directory 100B and the file 101A is sequenced and also the name information is coupled by a delimiter of, for example, "/(slash)".

Also, the file 101B is arranged under two directories 100B, 100C as an upper hierarchy and the two directories 100B, 100C are arranged under the directory 100A. The location information 102F about this file 101B is "Root/ProjectA/File1" and is the same as the location information 102E about the file 101A.

FIG. 4 is a diagram showing one example of the history management table. In this history management table 212, manipulation history information is stored every record. The manipulation history information is a manipulation user indicating a user in which manipulation is performed with respect to an object by a user ID, a manipulation object indicating the object in which its manipulation is performed by an identification ID, location information indicating the object in which its manipulation is performed, the contents of its manipulation, time of its manipulation, etc. as shown in FIG. 4.

(Operation of Embodiment)

Next, one example of an operation of the object management system according to the embodiment will be described with reference to FIGS. 4 to 6. The case where a user manipulates the terminal apparatus 3 and requests the object management apparatus 2 to transfer an object to the terminal apparatus 3 will be described herein.

First, a user manipulates the terminal apparatus 3 and activates the client program 30. The terminal apparatus 3 operates according to its client program 30, and displays a login screen for inputting login information. Then, when the user inputs my user ID and password on its login screen as the login information, the terminal apparatus 3 sends its login information to the object management apparatus 2 through the network 4.

Next, when its login information is received through the communication part 22, the object management section 206 of the object management apparatus 2 determines whether or not authentication is permitted to its login information by referring to the user management information 213. Then, the object management section 206 sends authentication result information indicating its determined result to the terminal apparatus 3.

Then, the terminal apparatus 3 displays a process request screen for specifying any of location information and an identification ID and making a process request in the case of indicating the effect that the authentication result information received from the object management apparatus 2 permits authentication. The user specifies an object of a processing object by inputting any of the location information and the identification ID as specification information on its process request screen. The case of respectively specifying the object of the processing object by the location information and the identification ID will hereinafter be described.

(1) Case of Specifying Object of Processing Object by Location Information

Figure 5:
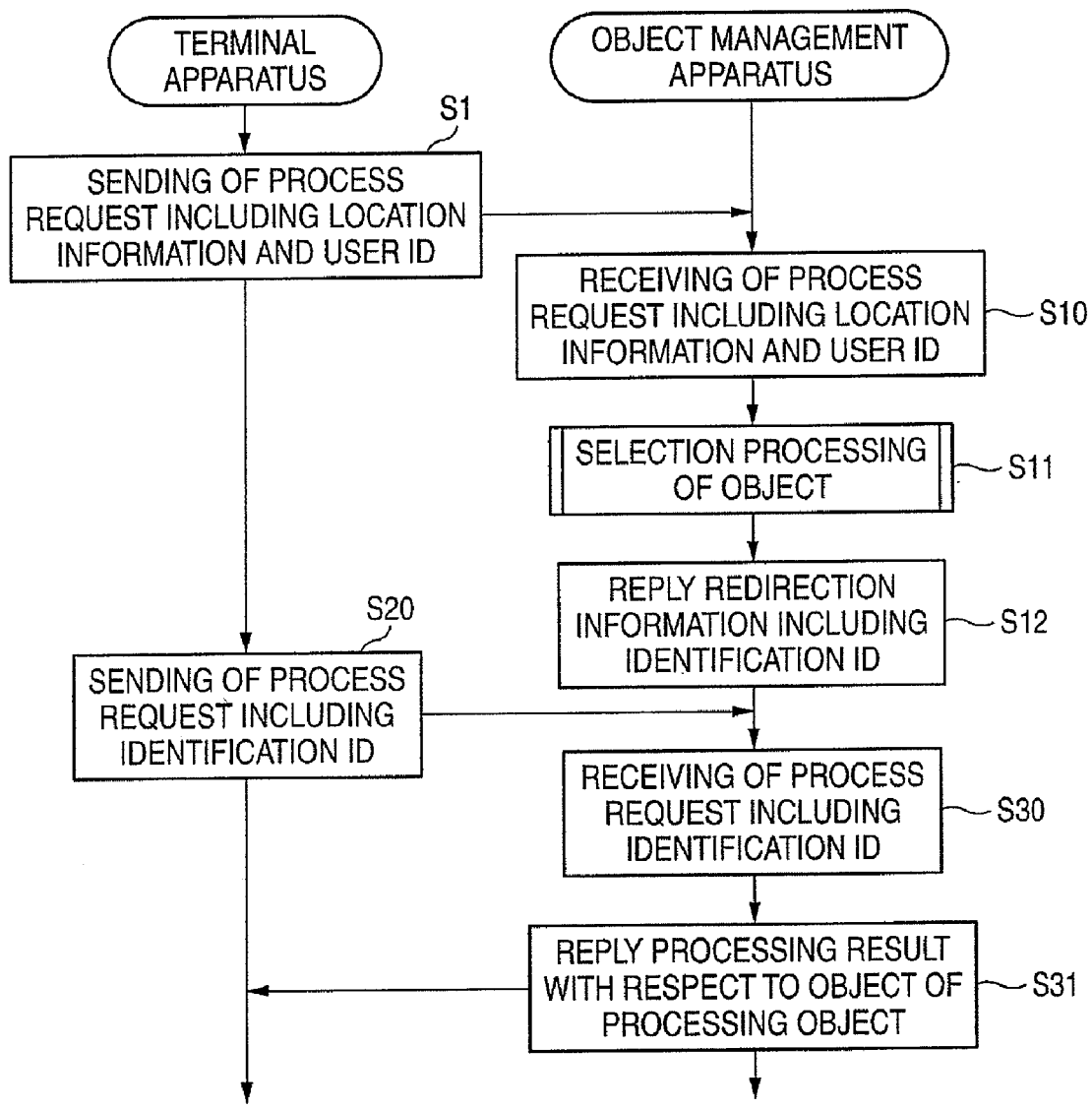
FIG. 5 is a flowchart showing one example of an operation of the object management system of the case of specifying an object of a processing object by location information.

FIG. 5 is a flowchart showing one example of an operation of the object management system of the case of specifying an object of a processing object by location information. The terminal apparatus 3 sends a process request including a user ID inputted on a login screen and location information inputted on an object specification screen by a user to the object management apparatus 2 (FIG. 5: S1).

Next, when the location information receiving section 200 of the object management apparatus 2 receives a process request from the terminal apparatus 3 (S10), a user ID and location information included in its received process request are sent to the selection section 203.

Then, the selection section 203 performs selection processing for selecting one object corresponding to the user ID and the location information from the object management table 211 as an object of a processing object by referring to the history management table 212 (S11).

Figure 6:
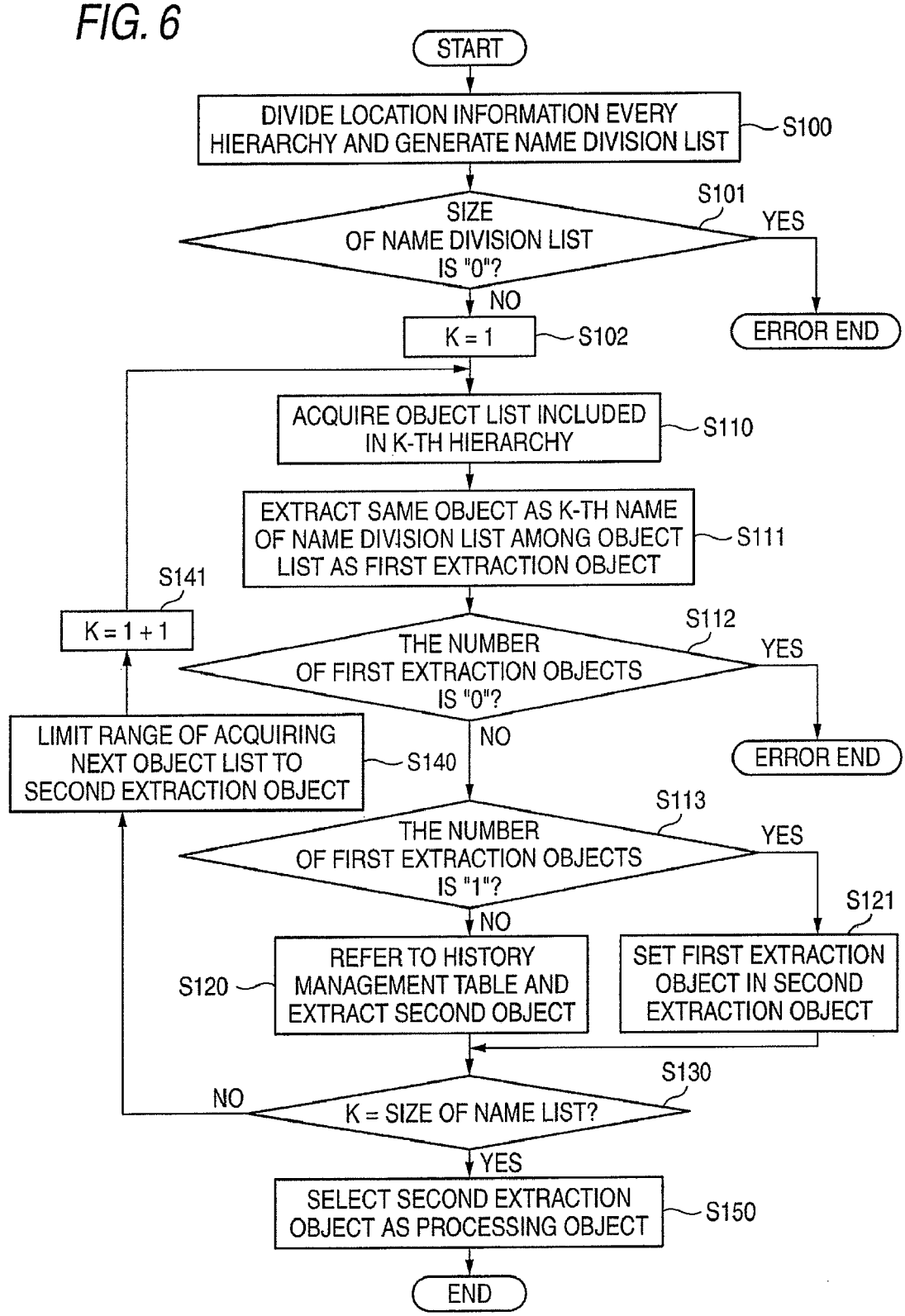
FIG. 6 is a flowchart showing one example of a detailed operation of selection processing in step S11 of FIG. 5.

FIG. 6 is a flowchart showing one example of a detailed operation of the selection processing in step S11 described above. The selection section 203 divides the location information by a delimiter every hierarchy and generates a name division list (FIG. 6: S100).

For example, when "http//www.example.com/root/projectA/File1" is received as location information, three pieces of name information about "root", "projectA" and "File1" are arranged sequentially from an upper hierarchy in the name division list. In addition, "http//www.example.com" is an address allocated to the object management apparatus 2 and the selection section 203 generates the name division list without including its address.

Next, the selection section 203 determines whether or not a list size M of the name division list is "0" (S101). Then, when the selection section 203 determines that the list size M is "0" (S101: Yes), the error end is performed. On the other hand, when the selection section 203 determines that the list size M is not "0" (S101: No), "1" is substituted into a counter k (S102).

Then, the selection section 203 refers to the object management table 211 and acquires list information indicating a list of objects included in the k-th hierarchy (S110).

Then, the selection section 203 retrieves an object to which the same name information as name information arranged in the k-th of the name division list is assigned from among objects included in the list information, and extracts the object as a first extraction object (S111).

Then, the selection section 203 determines whether or not the number N of first extraction objects by step S111 is "0" (S112), and when it is determined that the number N of first extraction objects is "0" (S112: Yes), the error end is performed. On the other hand, when the selection section 203 determines that the number N of first extraction objects is not "0" (S112: No), the selection section 203 determines whether or not the number N of first extraction objects is "1" (S113).

Then, when the selection section 203 determines that the number N of first extraction objects is not "1", that is, plural first extraction objects are present (S113: No), the selection section 203 refers to the history management table 212, and retrieves an object in which manipulation history information by a user ID received in step S1 is registered from among the first extraction objects, and extracts the object as a second extraction object (S120).

On the other hand, when the selection section 203 determines that the number N of first extraction objects is "1" (S113: Yes), the selection section 203 sets its first extraction object in the second extraction object (S121), and proceeds to the next step S130.

Then, the selection section 203 determines whether or not the counter k is equal to the list size M of the name division list (S130).

Then, when the selection section 203 determines that the counter k is not equal to the list size M (S130: No), a range of acquiring the next list information is limited to the second extraction object by step S120 (S140). Then, the selection section 203 performs increment processing for adding "1" to the counter k (S141), and returns to step S110.

On the other hand, when the selection section 203 determines that the counter k is equal to the list size M (S130: Yes), its second extraction object is selected as an object of a processing object (S150) and the selection processing is ended.

(Concrete Example of Selection Processing of Object)

Next, selection processing of the selection section 203 of the case of receiving the location information "http//www.example.com/root/projectA/File1" and a user ID "User-1" by the location information receiving section 200 will be described. In the location information of this case, a name division list in which a list size divided into three pieces of name information is "3" is generated, so that the processing shown in steps S110 to S130 described above is repeated three times by the selection section 203. In addition, the object management table 211 shall be in a state shown in FIG. 2 and the history management table 212 shall be in a state shown in FIG. 4.

In the first processing, the selection section 203 acquires a directory 100A of name information "Root" as list information (S110). Next, since name information about its directory 100A is the same as the first name information "Root" of a name list, the selection section 203 extracts the directory 100A as a first extraction object (S111). Then, the selection section 203 sets the first extraction object in a second extraction object (S121).

In the second processing, the selection section 203 acquires list information in a state in which a range of acquiring the list information is limited to the directory 100A which is the second extraction object (S110). Next, the selection section 203 extracts two directories 100B, 100C which are the same as the second name information "ProjectA" of the name list from among its list information as a first extraction object (S111). Then, the selection section 203 refers to the history management table 212 and extracts the directory 100B in which manipulation history information by a user ID "User-1" is registered from among the first extraction objects as a second extraction object (S120).

In the third processing, the selection section 203 acquires list information in a state in which a range of acquiring the list information is limited to the directory 100B (S110). Next, the selection section 203 extracts two files 101A, 101B which are the same as the third name information "File1" of the name list from among its list information as a first extraction object (S111). Then, the selection section 203 refers to the history management table 212 and extracts the file 101B in which manipulation history information by a user ID "User-1" is registered from among the first extraction objects as a second extraction object (S120).

Then, the selection section 203 selects the file 101B pinpointed by an identification ID "ID-D2" as an object of a processing object (S150). In addition, when similar location information is received together with a user ID "User-2", the file 101A in which manipulation history information by the user ID "User-2" is registered and pinpointed by an identification ID "ID-D1" is selected as an object of a processing object.

When an identification ID assigned to the object of the processing object selected as described above is sent to the redirection information reply section 204, the redirection information reply section 204 replies redirection information including its identification ID to the terminal apparatus 3 (FIG. 5: S12).

Then, when the terminal apparatus 3 receives its redirection information, the identification ID included in its redirection information is sent to the object management apparatus 2 (S20).

Then, when the identification ID receiving section 201 of the object management apparatus 2 receives an identification ID from the terminal apparatus 3 (S30), the object management section 206 performs processing according to a process request with respect to an object pinpointed by its identification ID and the processing result reply section 205 replies a processing result by the object management section 206 to the terminal apparatus 3 (S31).

(2) Case of Specifying Object of Processing Object by Identification ID

Figure 7:
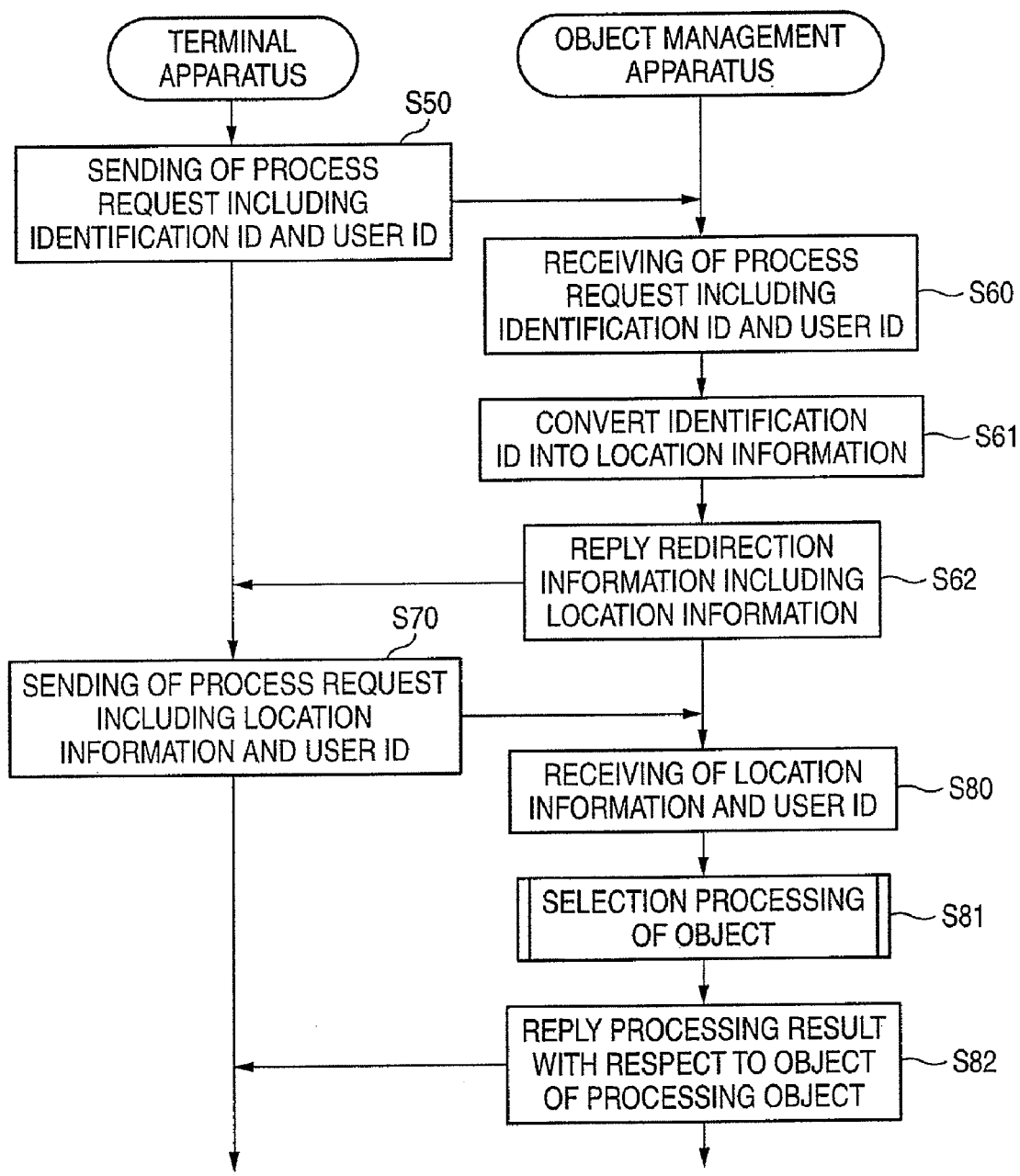
FIG. 7 is a flowchart showing one example of an operation of the object management system of the case of specifying an object of a processing object by an identification ID.

FIG. 7 is a flowchart showing one example of an operation of the object management system of the case of specifying an object of a processing object by an identification ID. The terminal apparatus 3 sends a process request including an identification ID inputted by a user to the object management apparatus 2 (FIG. 7: S50).

Next, when the identification ID receiving section 201 of the object management apparatus 2 receives a process request from the terminal apparatus 3 (S60), an identification ID included in its process request is sent to the conversion section 202. Then, the conversion section 202 refers to the object management table 211, and converts its identification ID into location information (S61).

Then, the redirection information reply section 204 replies redirection information including the location information converted by the conversion section 202 to the terminal apparatus 3 (S62).

Then, when the terminal apparatus 3 receives its redirection information, a process request including a user ID inputted on a login screen and the location information included in its redirection information is sent to the object management apparatus 2 (S70).

Then, when the location information receiving section 200 of the object management apparatus 2 receives a process request from the terminal apparatus 3 (S80), the selection section 203 performs selection processing by the flowchart of FIG. 6 based on the user ID and the location information included in its process request and selects an object of a processing object (S81).

Then, the object management section 206 performs processing according to a process request with respect to the object of the processing object selected, and the processing result reply section 205 replies a processing result by the object management section 206 to the terminal apparatus 3 (S82).

[Other Embodiment]

In addition, the invention is not limited to the embodiment described above, and may be modified variously without departing from the gist of the invention. For example, in the embodiment described above, each of the section had by the object management apparatus has been implemented by the control part and the control program, but apart or all of them may be implemented by hardware.

Also, the program used in the embodiment described above may be read from a record medium such as CD-ROM to a storage part of the inside of an apparatus or may be downloaded from a server etc. connected to a network such as the Internet to a storage part of the inside of an apparatus.

Also, the object management system in the embodiment described above could comprise data, functions, etc. had by the object management apparatus as the whole system and, for example, an object management table or a history management table may be stored in a storage apparatus such as a database server or other file server.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A non-transitory computer readable medium storing a program that causes a computer to execute information processing, wherein plural pieces of management object information are stored in a storage device in a storage structure of a predetermined type with unique identification information and non-unique name information being assigned to each management object information, the information processing comprising:

receiving a process request that specifies management object information of a process object by using location information, wherein the location information is represented by a sequence of name information assigned to respective pieces of management object information from management object information serving as an origin to the management object information of the process object;

selecting, from the storage device as the management object information of the process object, one piece of management object information corresponding to the location information used by the received process request with reference to history information which is registered with the location information of the process object and the management object information of the process object being associated with each other; and sending back a result of a process that is executed for the selected management object information of the process object in accordance with the process request, wherein the received process request further includes user information, and wherein the selecting step selects one piece of management object information corresponding to the location information used by the received process request with reference to history information which is registered with the location information of the process object, the user information and the management object information of the process object being associated with each other.

2. An information processing apparatus comprising:

a storage device that stores plural pieces of management object information in a storage structure of a predetermined type with unique identification information and non-unique name information being assigned to each management object information;

receiving section that receives a process request that specifies management object information of a process object by using location information, wherein the location information is represented by a sequence of name information assigned to respective pieces of management object information from management object information serving as an origin to the management object information of the process object;

selecting section that selects, from the storage device as the management object information of the process object, one piece of management object information corresponding to the location information used by the received process request with reference to history information which is registered with the location information of the process object and the management object information of the process object being associated with each other; and sending back section that sends back a result of a process that is executed for the management object information of the process object selected by the selecting section in accordance with the process request, wherein the process request received by the receiving section further includes user information, and wherein the selecting section selects one piece of management object information corresponding to the location information used by the received process request with reference to history information which is registered with the location information of the process object, the user information and the management object information of the process object being associated with each other.

* * * * *